United States Patent [19]

Terada

[11] 4,429,979
[45] Feb. 7, 1984

[54] PHOTOGRAPHING DATA INDICATOR FOR A SINGLE LENS REFLEX CAMERA

[75] Inventor: Katumi Terada, Hachioji, Japan

[73] Assignee: Olympus Optical Company Ltd., Japan

[21] Appl. No.: 346,125

[22] Filed: Feb. 5, 1982

[30] Foreign Application Priority Data

Mar. 13, 1981 [JP] Japan ............... 56-36110[U]

[51] Int. Cl.³ .............................................. G03B 17/20
[52] U.S. Cl. .................................. 354/289.1; 354/219; 350/336
[58] Field of Search ............... 354/53, 60 E, 219, 289, 354/39, 57, 60 L; 350/336

[56] References Cited

U.S. PATENT DOCUMENTS

| | | |
|---|---|---|
| 4,051,503 | 9/1977 | Uno et al. .............................. 354/53 |
| 4,140,378 | 2/1979 | Suzuki et al. .......................... 354/53 |
| 4,212,011 | 7/1980 | Waldron .............................. 350/336 |

FOREIGN PATENT DOCUMENTS 51-554817  4/1976  Japan .

*Primary Examiner*—A. A. Mathews
*Attorney, Agent, or Firm*—Ostrolenk, Faber, Gerb & Soffen

[57] ABSTRACT

A photographing data indicator for a single lens reflex camera comprises a first drive electrode having a through opening formed therein, the configuration of which represents photographing data, and a second drive electrode having a solid configuration representing photographing data and disposed inside the through opening formed in the first drive electrode. Both the first and the second drive electrodes are disposed on a liquid crystal display panel which is in turn disposed within a viewfinder of the camera.

8 Claims, 5 Drawing Figures

PHOTOGRAPHING DATA INDICATOR FOR A SINGLE LENS REFLEX CAMERA

BACKGROUND OF THE INVENTION

The invention relates to photographing data indicator for a single lens reflex camera, and more particularly, to an indicator which includes a liquid crystal display panel to display photographing data such as shutter speed, diaphragm aperture or the like within a viewfinder of the camera.

The use of a liquid crystal display panel to display photographing data such as shutter speed or diaphragm aperture within the viewfinder of a single lens reflex camera is already well known. The conventional arrangement comprises a liquid crystal display panel which is disposed laterally adjacent a scale on a front surface on which graduations for photographing data such as shutter speed are inscribed, and an exciting voltage is applied to energize a particular drive electrode which is aligned with a given point on the scale so that a corresponding area of the panel may be rendered opaque. However, this technique is disadvantageous in that it requires an increased lateral space where a number of photographing data are to be displayed. By way of exaple, if it is desired to display both the proper value of shutter speed which is derived from a photometric circuit of the camera and the actual value of shutter speed which is preset on a shutter speed presetting dial of the camera (so as to provide a display which simulates a display produced by an exposure controller of the type in which the pointer of an exposure meter moves toward a light indicative of a proper exposure level as the dial is moved), or where it is desired to display both the values of shutter speed and diaphragm aperture, two or more rows of liquid crystal display panels must be laterally juxtaposed with the photographing data scale. In order to maintain these rows of display panels within the sight of a viewer together with the picture plane of the finder, it is necessary that the viewfinder be provided with an increased field of view. This requires that the lateral dimension of the pentaprism be increased, which also necessitates that the vertical dimension of the prism be increased in addition to the lateral dimension due to design considerations. This results in an increased size of the pentaprism and an increased weight and volume of the camera, causing an increased cost of the camera.

To overcome this difficulty, a photographing data indicator for single lens reflex camera (see Japanese Utility Model Publication No. 4,817/1980) has been proposed which permits more than one piece of data to be concurrently displayed without increasing the lateral dimension of the display, by disposing a pair of liquid crystal display panels in superimposition with each other below a transparent glass pane on which a data scale is inscribed, utilizing the characteristic of a liquid crystal display panel that a light transmittivity equal to or greater than 90% is available when it is not energized. Such a display unit 1 is illustrated in FIG. 1, and comprises a bank of liquid crystals 2 which are used to provide a display of a proper value of shutter speed and which are enclosed in a pair of transparent glass panes 4, and another bank of liquid crystals 3 for providing a display of a manually preset value of shutter speed and which are also enclosed in a pair of transparent glass panes 5, both the glass panes being disposed in overlying relationship with each other. A shutter speed scale 6 is formed or inscribed on the surface of the topmost glass pane 4. As shown in FIG. 2, the display unit 1 is interposed between a focusing glass 7 and a pentaprism 8 forming part of the finder optics of a single lens reflex camera, toward one lateral edge thereof. In FIG. 2, numeral 9 represents a stationary member which supports the focusing glass 7, and 10 represents a movable reflecting mirror.

In the use of the display unit 1, FIG. 3 illustrates that an output from a photometric circuit of the camera energizes one of the liquid crystals in the bank 2 which corresponds to a point on the scale 6 representing a proper value of shutter speed. Simultaneously, one of the liquid crystals in the bank 3 which corresponds to a point on the scale 6 corresponding to a value of shutter speed which is manually preset on the shutter speed dial of the camera is energized. As an example, the proper value of shutter speed is shown as 1/500 second while the manual preset value is equal to 1/125 second. In this manner, both the values are simultaneously displayed.

However, the described indicator 1 requires that the spacing between the focusing glass and the pentaprism be increased in order to allow the indicator to be disposed therebetween inasmuch as the pair of laminated liquid crystal display panels results in an increased thickness. The increased spacing between the focusing glass and the pentaprism results in a relatively high elevation where the pentaprism is located. This increases the height of the camera, causing an increased size of the camera, a reduced finder magnification and a reduced accuracy of the focusing operation.

SUMMARY OF THE INVENTION

To eliminate the described disadvantages of the prior art, it is an object of the invention to provide photographing data indicator for a single lens reflex camera which permits a plurality of types of photographing data to be concurrently displayed, by providing a first and a second drive electrode on a liquid crystal display panel, and selectively applying an exciting voltage to one or both of the electrodes, both the electrodes being configured such that one of them is provided with a through opening in the form of a numeral or letter and punched into the electrode while the other is configured as a solid character received in the punched space.

In accordance with the invention, the use of the single liquid crystal display panel is sufficient to provide a concurrent display of more than one type of photographing data. This avoids the need for an increased spacing between the focusing glass and the pentaprism, thus effectively allowing the prevention of an increased size of a camera and a reduction in the finder magnification.

A lateral space required for the data display is reduced, allowing more than one piece of data to be displayed in a camera which has a comparable size to that of conventional cameras.

The photographing indicator of the present invention comprises:
- a first drive electrode having a through opening formed therein, the configuration of which represents photographing data;
- a second drive electrode having a solid configuration which represents photographing data and which is disposed inside the through opening formed in the first drive electrode;

the first and second drive electrodes being disposed on a liquid crystal display panel which is in turn disposed within a viewfinder of a camera; and a drive means for operating said data indicator in a first mode wherein only the first drive electrode is visible, a second mode wherein only the second drive electrode is visible, and a third mode wherein both the first and second drive electrodes, as well as the portion of the liquid crystal display panel adjacent the electrodes, are invisible whereby the data indicator is totally transparent when operated in the third mode.

DESCRIPTION OF PREFERRED EMBODIMENT

Figure 4:
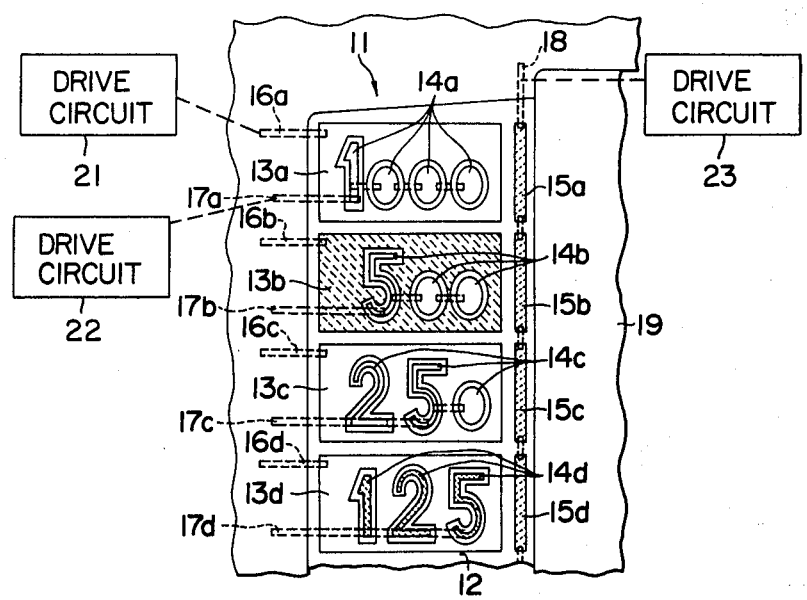
FIG 4 is a fragmentary enlarged plan view of photographing data indicator for single lens reflex camera according to one embodiment of the invention.

Referring to FIG. 4, there is shown a photographing data indicator for single lens reflex camera according to the present invention. The indicator 11 comprises a single liquid crystal display panel 12 on which are disposed a plurality of first drive electrodes 13a–13n (13e to 13n being not shown) each of which is formed with a plurality of through openings punched therein, the electrodes 13a–13n collectively representing a selected, proper value of shutter speed by the configurations of the through openings, a plurality of second drive electrodes 14a–14n (14e to 14n being not shown) which collectively represent a selected, manually preset value of shutter speed by solid characters, and a plurality of third drive electrodes 15a–15n (see FIG. 5) which indicate the number of steps.

Each of the first drive electrodes 13a–13n comprises a rectangular transparent electrode in which through openings are punched representing numerals, the combination of the numerals carried by each of the electrodes 13a–13n representing a particular value of shutter speed. It will be understood that the numerals are longitudinally aligned with each other in descending order as viewed from left to right. Each of the second drive electrodes 14a–14n comprises a plurality of transparent electrodes disposed in the through openings punched in each of the first electrodes 13a–13n and each having a solid configuration representing a numeral which is the same as the numeral which is represented by the associated through opening. Obviously, the second drive electrodes 14a–14n have a slightly less dimension than that of the through opening formed in the first drive electrodes 13a–13n, so that a clearance is left between the both electrodes 13a–13n and 14a–14n. The purpose of the clearance is to define a numeral when associated ones of the first drive electrodes 13a–13n and the second drive electrodes 14a–14n are simultaneously energized to make the corresponding liquid crystals opaque, thus enabling a value of shutter speed to be clearly visible. The third drive electrodes 15a–15n are in the form of a series of elongate strips located to the right of the first drive electrodes 13a–13n.

Each of the first drive electrodes 13a–13n is connected to a drive circuit 21 through a transparent lead wire 16a–16n (16e to 16n being not shown and only a single connection to lead 16a being shown), respectively, and the drive circuit operates in response to an output from a photometric circuit of the camera to apply an energizing voltage to one of the drive electrodes 13a to 13n selectively, thus making the corresponding liquid crystals opaque. In this manner, a proper value of shutter speed is clearly displayed. Also, each of the second drive electrodes 14a–14n is connected to another drive circuit 22 through respective transparent lead wires 17a–17n (17e to 17n being not shown and only a single connection to lead 17a being shown) and this drive circuit operates in accordance with a position of a shutter speed presetting dial of the camera, thus selectively applying an energizing voltage to one of the drive electrodes 14a to 14n to make the corresponding liquid crystals opaque. It should be understood that segments of any particular second electrode are interconnected. In this manner, a manually preset value of shutter speed is also displayed. The third drive electrodes 15a to 15n are connected through a transparent lead wire 18 to a further drive circuit 23 which is energized when the power supply to the indicator 11 is turned on. When the energizing voltage is simultaneously applied to all of the drive electrodes 15a–15n, the corresponding strip-shaped liquid crystal areas are rendered opaque, thus normally providing a display of the number of steps to be changed to bring the both values of the shutter speed into coincidence.

Figure 1:
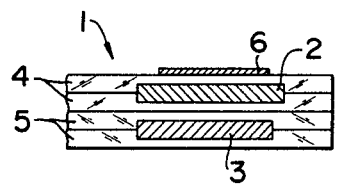
FIG. 1 is an enlarged cross section of one exemplary photographing data indicator of the prior art for single lens reflex camera.
Figure 2:
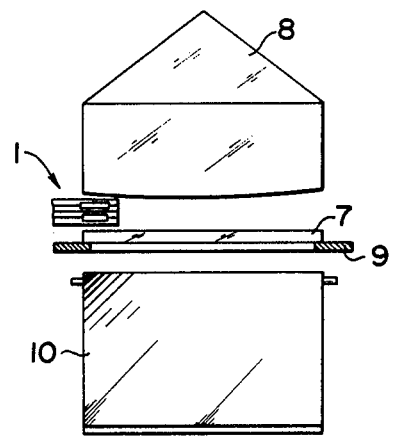
FIG. 2 is a schematic front view of finder optics of the single lens reflex camera, illustrating the location of the indicator shown in FIG. 1.
Figure 3:
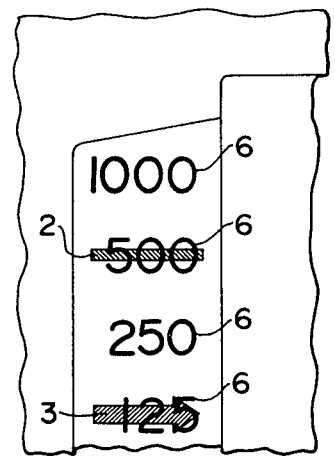
FIG. 3 is a fragmentary enlarged plan view of the indicator shown in FIG. 1, illustrating the manner of display provided thereby.
Figure 5:
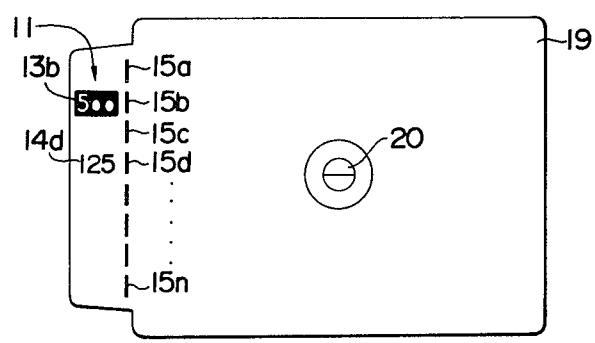
FIG. 5 is a front view of an image field of the finder, illustrating the manner of display provided by the indicator of FIG. 4.

It will be noted that the liquid crystal display panel 12 thus constructed is interposed between the focusing glass 7 and the pentaprism 8 of the finder optics of the camera (see FIG. 2) so that it is visible at one lateral edge, or the left-hand edge as viewed in FIG. 5, of a picture plane 19 of the finder, when viewed from the eyepiece of the finder.

In use, a proper value of shutter speed, for example, 1/500 second, can be displayed in the form of a series of through openings by applying the energizing voltage to the first drive electrode 13b, as indicated in FIG. 5. A manually preset value of shutter speed of 1/125 second, for example, is displayed by the solid configuration, by applying the energizing voltage to the second drive electrode 14d. Accordingly, the disagreement between the proper value and the manually preset value of shutter speed can be immediately recognized, and a user is informed that a picture can be taken with the proper exposure by manually presetting a shutter speed of 1/500 second. In this instance, the energizing voltage is also applied to the third drive electrodes 15a–15n displaying the number of steps, whereby it is found that the shutter speed presetting dial may be moved through two steps in order to bring the manually preset value into coincidence with the proper value of shutter speed.

As made clear by the foregoing, each of the photographing data indicators forming the display of the present invention is operable in a first mode wherein only the first drive electrode 13 is visible, a second mode wherein only the second drive electrode 14 is visible, and a third mode wherein both the first and second drive electrodes 13, 14, as well as the portion of the liquid crystal display panel adjacent the electrodes, are invisible whereby the data indicator is totally transparent when operated in the third mode.

In FIG. 5, numeral 20 represents a split image which is utilized for purpose of focus adjustment.

In the embodiment described above, the photographing data indicator has been described as providing a concurrent display of the proper value and the manually preset value of shutter speed. However, it should be understood that information displayed by the indicator is not limited to these values of shutter speed. By way of example, it may be utilized to display a value of shutter speed which represents a limit of hand shaking and a manually preset value of shutter speed, or a programmed value of shutter speed and a diaphragm aperture or a proper value of diaphragm aperture and a manually preset value of diaphragm aperture.

In the described arrangement, the second drive electrodes are registered within the through openings formed in the first drive electrodes. However, areas of the liquid crystal which are disposed in confronting relationship with the second drive electrodes may be formed of a liquid crystal material of a different composition from that of the liquid crystal areas which are confronting with the first drive electrodes, so that displays produced by both the electrodes are in different colors when the energizing voltage is applied thereto. This permits a more clear recognition of information being displayed in particular when the energizing voltage is simultaneously applied to both the first and the second drive electrode located in corresponding position.

While the information being displayed in the above embodiment is numerical information, letter information such as "OK", for example, or other symbols such as a crooked arrow may also be displayed.

What is claimed is:

1. Photographing data indicator for single lens reflex camera, comprising:
    a first drive electrode having a through opening formed therein, the configuration of which represents photographing data;
    a second drive electrode having a solid configuration which represents photographing data and which is disposed inside the through opening formed in the first drive electrode;
    the first and second drive electrodes being disposed on a liquid crystal display panel which is in turn disposed within a viewfinder of a camera; and
    a drive means for operating said data indicator in a first mode wherein only said first drive electrode is visible, a second mode wherein only said second drive electrode is visible, and a third mode wherein both said first and second drive electrodes, as well as the portion of said liquid crystal display panel adjacent said electrodes, are invisible whereby said data indicator is totally transparent when operated in said third mode.

2. Photographing data indicator according to claim 1, in which the liquid crystal display panel is interposed between a focusing glass and a pentaprism of finder optics associated with said viewfinder so that it is located along one lateral edge of the picture plane of the finder, as viewed from the eyepiece of the finder.

3. Photographing data indicator according to claim 1, in which the first drive electrode is adapted to display a proper value of shutter speed in response to an output from a photometric circuit of the camera while the second drive electrode is adapted to display a value of shutter speed which is established by a shutter speed presetting member of the camera.

4. Photographing data display for a single lens reflex camera, comprising:
    a plurality of first drive electrodes each having a respective through opening formed therein, the configuration of each through opening representing a respective photographing data, said first drive electrodes being disposed in a row;
    a plurality of second drive electrodes equal in number to the number of first drive electrodes, each of said second drive electrodes having a configuration representing a respective photographing data, each of the second drive electrodes being associated with a respective one of the first drive electrodes and being located in the through opening thereof;
    each of said first and second drive electrodes being disposed on a liquid crystal display panel which is located in a viewfinder of a camera, each pair of associated first and second drive electrodes cooperating with the adjacent portion of said liquid crystal display panel to form a single data indicator whereby said photographing data display includes a plurality of photographing data indicators; and
    a drive means for selectively operating each respective said photographic data indicators in a first mode wherein only said first drive electrode of said respective indicator is visible, a second mode wherein only aid second drive electrode of said respective indicator is visible and a third mode wherein both said first and second drive electrodes, as well as the portion of said liquid crystal display surrounding said electrodes, are invisible whereby said respective data indicator is totally transparent when operated in said third mode and said drive circuit can cause only selected said data indicators to be visible at any given instant.

5. Photographing data display according to claim 4, wherein said drive means only causes one of said first drive electrodes and one of said second drive electrodes to be visible at any given time and further including additional electrodes located on said liquid crystal display panel, said additional electrodes being driven by said drive means in a manner which is indicative of the difference between the photographing data indicated by that said first drive electrode which is made visible by said drive means and the photographing data indicated by that said second drive electrode which is made visible by said drive means.

6. Photographing data display according to claim 5, wherein said additional electrodes include a plurality of third drive electrodes aligned in a row for indicating the relative distance between that said first drive electrode made visible by said drive means and that said second drive electrode made visible by said drive means, each of said third drive electrodes being located adjacent a respective said first drive electrode.

7. Photographing data display according to claim 4, wherein said liquid crystal display panel is interposed between a focusing glass and a pentaprism of finder optics associated with said viewfinder so that it is located along one lateral edge of the picture plane of said finder, as viewed from the eyepiece of said finder.

8. Photographing data display according to claim 4, wherein said drive means causes that one of said first drive electrodes to be visible which corresponds to the proper value of shutter speed as determined by a photometric circuit of said camera and said drive means drives that one of said second drive electrodes which represents a photographing data indicative of a shutter speed which is established by a shutter speed presetting member of said camera.

* * * * *